(12) United States Patent
Jones (10) Patent No.: US 10,974,945 B1
(45) Date of Patent: Apr. 13, 2021

(54) BAR GUN HOLSTER (71) Applicant: Jason Jones, Santa Barbara, CA (US)

(72) Inventor: Jason Jones, Santa Barbara, CA (US)

( * ) Notice: Subject to any disclaimer, the term of this patent is extended or adjusted under 35 U.S.C. 154(b) by 0 days.

(21) Appl. No.: 16/774,160

(22) Filed: Jan. 28, 2020

(51) Int. Cl.
*B67D 1/08* (2006.01)
*F16B 1/00* (2006.01)
B67D 1/06 (2006.01)
B67D 1/00 (2006.01)

(52) U.S. Cl.
CPC ............ B67D 1/0889 (2013.01); F16B 1/00 (2013.01); *B67D 1/0086* (2013.01); *B67D 1/06* (2013.01); *F16B 2001/0035* (2013.01)

(58) Field of Classification Search
CPC ...... B67D 1/0889; B67D 1/06; B67D 1/0086; F16B 1/00; F16B 2001/0035
See application file for complete search history.

(56) References Cited

U.S. PATENT DOCUMENTS

| 699,481 A | 5/1902 | Boyd | |
| 5,152,429 A * | 10/1992 | Billings | ............... B67D 1/0084 222/129.2 |
| 5,395,013 A * | 3/1995 | Billings | ................... B67D 1/06 222/132 |
| 8,123,079 B2 | 2/2012 | Schroeder | |
| 8,448,821 B2 | 5/2013 | Hecht | |
| 9,706,794 B2 | 7/2017 | Hecht | |
| 9,964,234 B2 | 5/2018 | Hecht | |
| 2009/0277927 A1* | 11/2009 | Schroeder | ............ B67D 1/0084 222/108 |
| 2011/0220159 A1* | 9/2011 | Ellickson | ................... B08B 9/00 134/198 |
| 2011/0286883 A1* | 11/2011 | Hecht | ........................ A61L 2/10 422/24 |
| 2013/0206792 A1* | 8/2013 | Schroeder | ............ B67D 1/0021 222/129.1 |
| 2016/0010763 A1* | 1/2016 | Hecht | ..................... F16L 3/003 222/180 |
| 2017/0129760 A1* | 5/2017 | Aneson | ................. B05B 15/555 |
| 2017/0320720 A1 | 11/2017 | Hecht | |
| 2018/0111168 A1* | 4/2018 | Aneson | ...................... B08B 3/08 |
| 2018/0177329 A1* | 6/2018 | Segiet | ................... A47J 31/407 |
| 2018/0251362 A1 | 9/2018 | Salem | |

FOREIGN PATENT DOCUMENTS

WO 2011146878 11/2011

* cited by examiner

*Primary Examiner* — Frederick C Nicolas (57) ABSTRACT

The bar gun holster is a mechanical device. The bar gun holster attaches a bar gun to a counter such that the bar gun is readily available to dispense a beverage such as soda. The bar gun is a mechanical device that dispenses a plurality of beverages is a draught manner. The beverage dispensed through the bar gun is selectable. The bar gun further comprises a nozzle and a handle. The bar gun holster comprises a counter plate, an intermediate structure, a bar gun mount, and hardware. The counter plate and the bar gun mount attach to the intermediate plate. The hardware: a) assembles the bar gun holster; and, b) attaches the bar gun holster to the counter.

17 Claims, 5 Drawing Sheets

BAR GUN HOLSTER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of performing operations including dispensing liquids, more specifically, a handheld gun type valve for dispensing a beverage. (B67D1/0086)

SUMMARY OF INVENTION

The bar gun holster is a mechanical device. The bar gun holster attaches a bar gun to a counter such that the bar gun is readily available to dispense a beverage such as soda. The bar gun is a mechanical device that dispenses a plurality of beverages in a draught manner. The beverage dispensed through the bar gun is selectable. The bar gun further comprises a nozzle and a handle. The bar gun holster comprises a counter plate, an intermediate structure, a bar gun mount, and hardware. The counter plate and the bar gun mount attach to the intermediate plate. The hardware: a) assembles the bar gun holster; and, b) attaches the bar gun holster to the counter.

These together with additional objects, features and advantages of the bar gun holster will be readily apparent to those of ordinary skill in the art upon reading the following detailed description of the presently preferred, but nonetheless illustrative, embodiments when taken in conjunction with the accompanying drawings.

In this respect, before explaining the current embodiments of the bar gun holster in detail, it is to be understood that the bar gun holster is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the bar gun holster.

It is therefore important that the claims be regarded as including such equivalent construction insofar as they do not depart from the spirit and scope of the bar gun holster. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
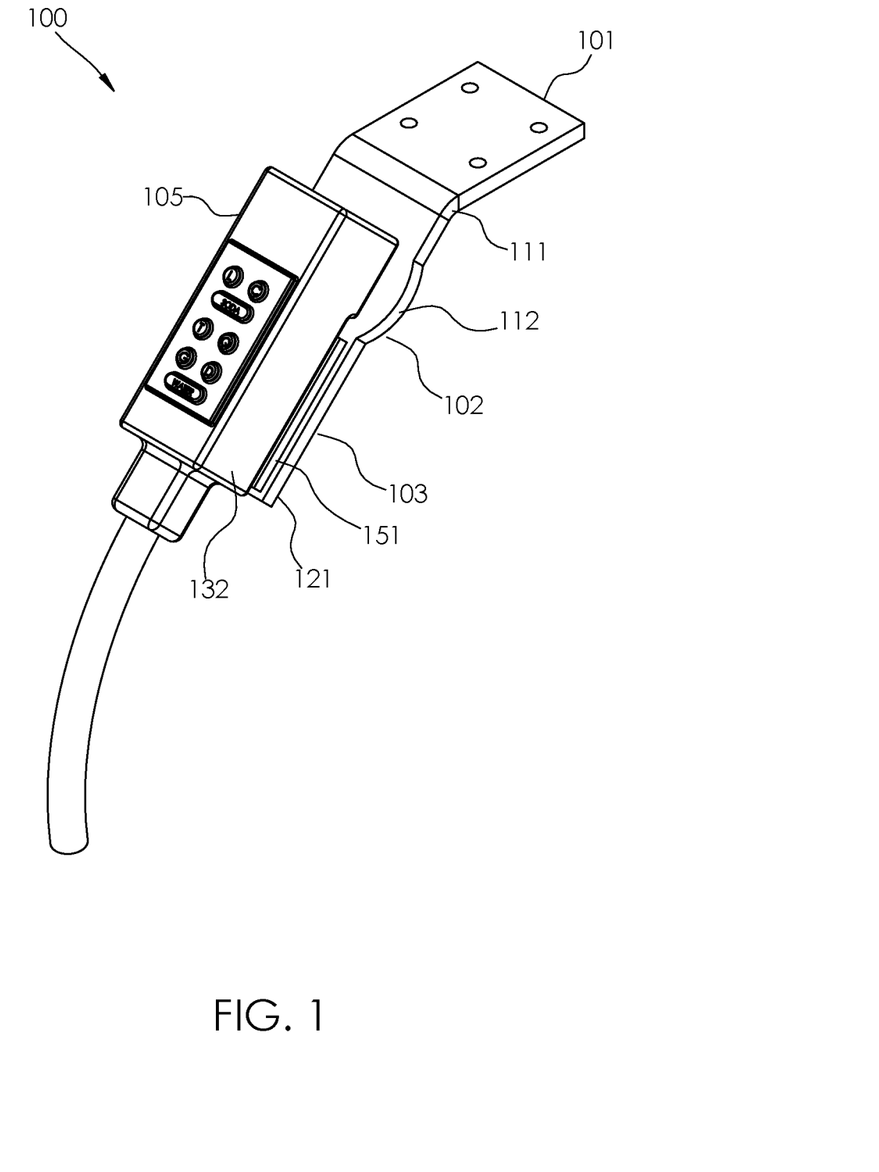
FIG. 1 is a perspective view of an embodiment of the disclosure.
Figure 2:
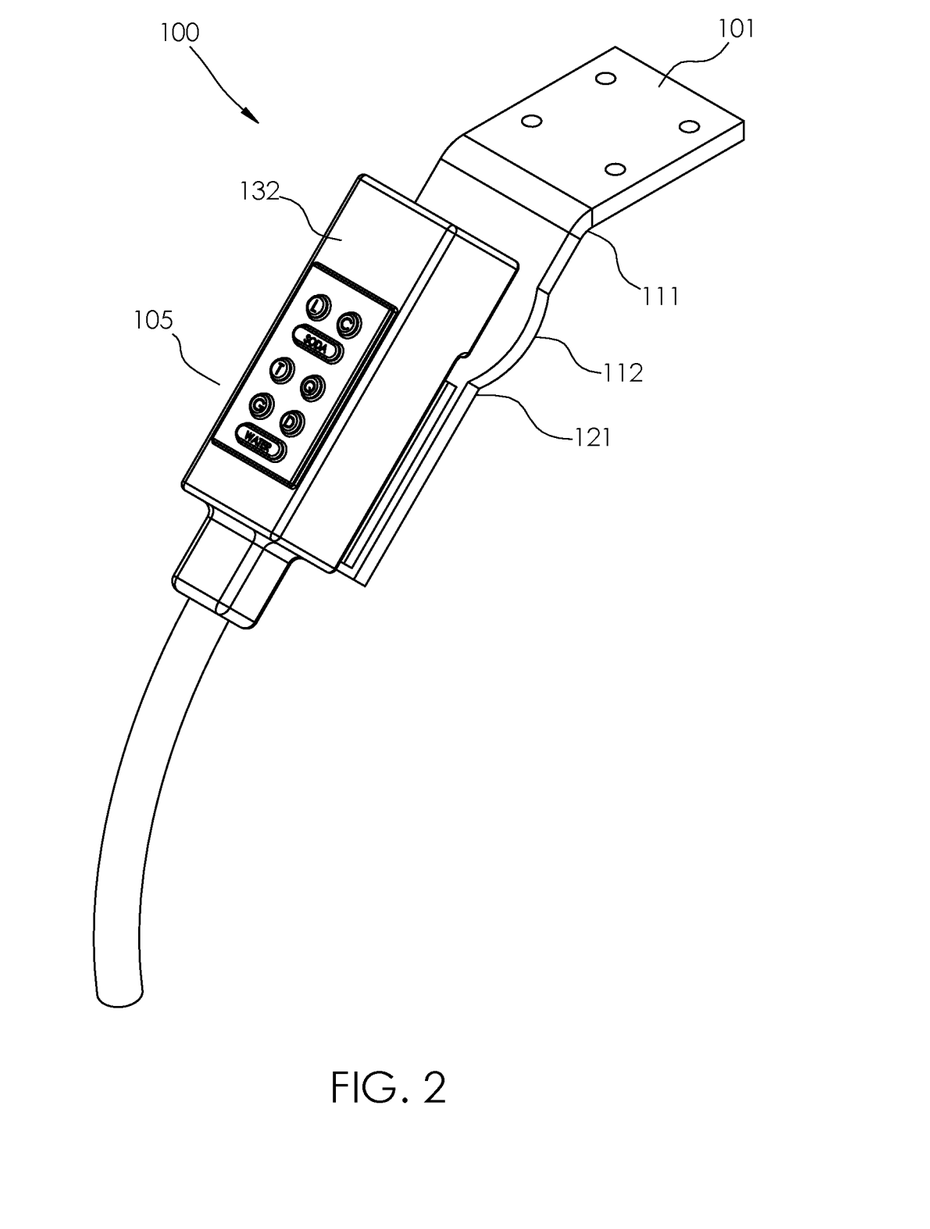
FIG. 2 is a perspective view of an alternate embodiment of the disclosure.
Figure 3:
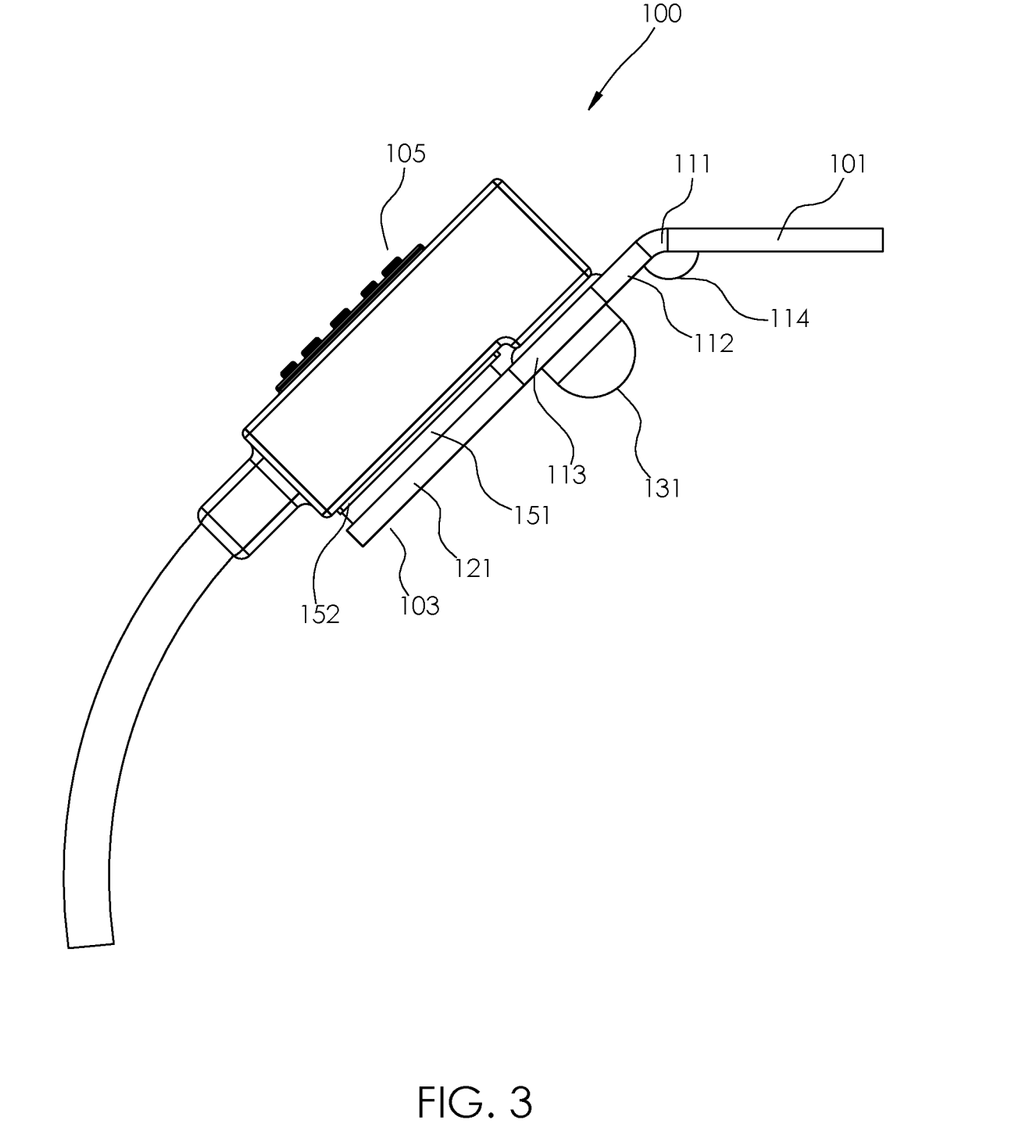
FIG. 3 is a side view of an embodiment of the disclosure.
Figure 4:
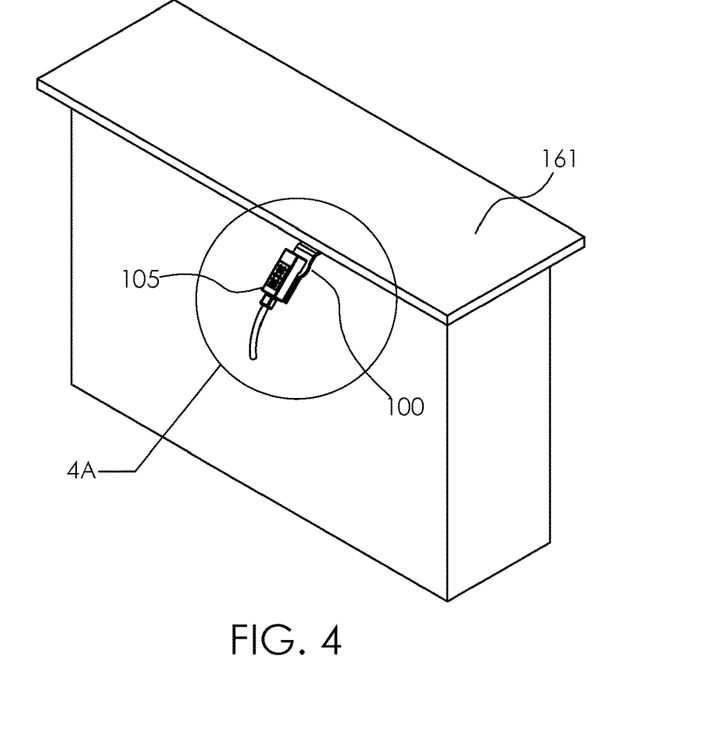
FIG. 4 is an in-use view of an embodiment of the disclosure.
Figure 4A:
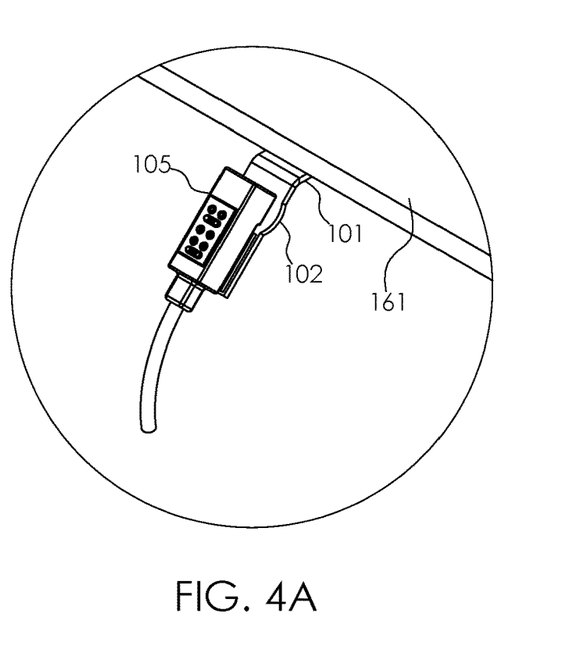
FIG. 4A is a detail view of an embodiment of the disclosure.
Figure 5:
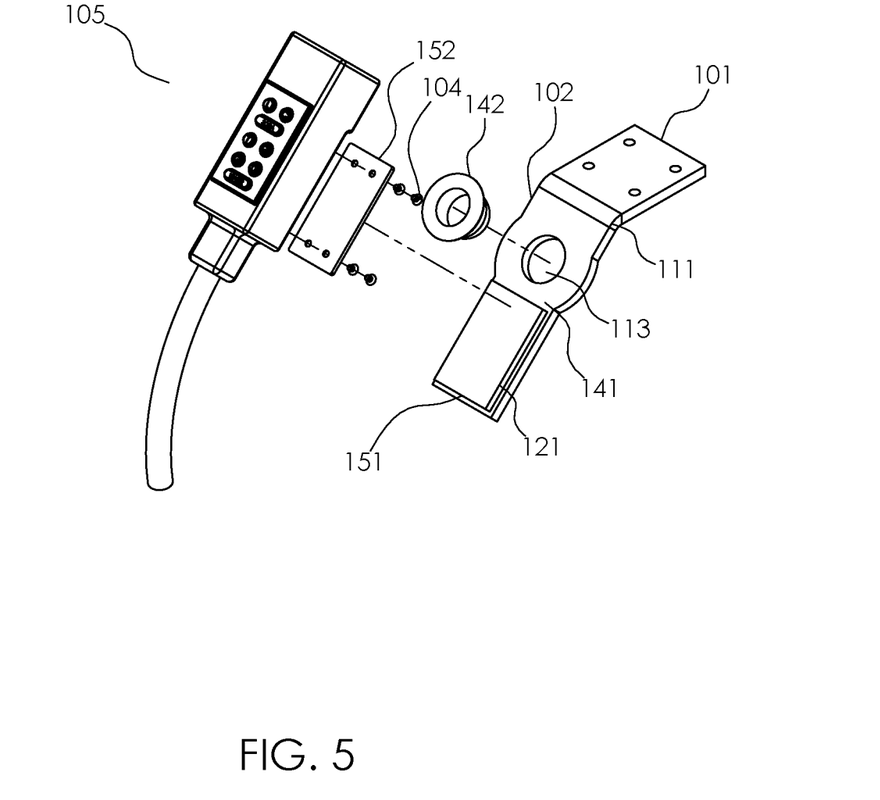
FIG. 5 is an exploded view of an embodiment of the disclosure.

Detailed reference will now be made to one or more potential embodiments of the disclosure, which are illustrated in FIGS. 1 through 5.

The bar gun holster is a mechanical device. The invention 100 attaches a bar gun 105 to a counter 161 such that the bar gun 105 is readily available to dispense a beverage such as soda. The bar gun 105 is a mechanical device that dispenses a plurality of beverages is a draught manner. The beverage dispensed through the bar gun 105 is selectable. The counter 161 is defined in greater detail elsewhere in this disclosure.

The invention 100 comprises a counter 161 plate 101, an intermediate structure 102, a bar gun 105 mount 103 and hardware 104. The counter 161 plate 101 and the bar gun 105 mount 103 attach to the intermediate structure 102. The hardware 104: a) assembles the invention 100; and, b) attaches the invention 100 to the counter 161. The counter 161 plate 101 and the bar gun 105 mount 103 attach to the intermediate structure 102 such that the counter 161 plate 101 and the bar gun 105 mount 103 are diametrically opposed.

The bar gun 105 has a manifold structure that is capable of routing a plurality of beverages through a single nozzle 131. The use of a bar gun 105 is well-known and documented in the culinary arts. The bar gun 105 further comprises a nozzle 131, a handle 132, and a plate member 152.

The nozzle 131 is a discharge port that is formed in the bar gun 105. The nozzle 131 has a hollow truncated pyramid structure with an open base and an open truncated apex. The bar gun 105 discharges a beverage through the nozzle 131. The handle 132 is a prism-shaped structure that forms the grip of the bar gun 105. The nozzle 131 attaches to the handle 132. The plate member 152 attaches to the handle 132 of the bar gun 105 using a subset of hardware 104 selected from the hardware 104. The plate member 152 is either a magnetic plate or a metal plate. The plate member 152 has a disk structure.

The plate member 152 is geometrically similar to the handle 132 of the bar gun 105. The span of the length of the perimeter of the plate member 152 is lesser than the span of the length of the perimeter of the handle 132 of the bar gun 105 such that the plate member 152 fits within the surface area of a face of the supporting disk 121. The plate member 152 magnetically attracts and attaches to the first magnet 151 of the bar gun 105 mount 103 when the nozzle 131 of the bar gun 105 inserts into the bushing 113 of the intermediate structure 102.

The hardware 104 comprises readily and commercially available fastening devices used to assemble the invention. The hardware 104 is defined in greater detail elsewhere in this disclosure.

The counter 161 plate 101 is a plate. The counter 161 plate 101 has a disk structure. The counter 161 plate 101 attaches the intermediate structure 102 to the inferior surface of the counter 161. A subset of hardware 104 selected from the hardware 104 attaches the counter 161 plate 101 to the inferior surface of the counter 161. The counter 161 plate 101 attaches the invention 100 to the counter 161 such that the intermediate structure 102 and the bar gun 105 mount 103 project beyond the edge of the counter 161 such that the intermediate structure 102 and the bar gun 105 mount 103 are not contained within the space underneath the counter 161.

The intermediate structure 102 is a plate. The intermediate structure 102 has a non-Euclidean disk structure. The intermediate structure 102 has a ring structure. An edge of the intermediate structure 102 attaches to an edge of the counter 161 plate 101. The aperture of the ring structure of the intermediate structure 102 receives the nozzle 131 of the bar gun 105 when the bar gun 105 is stored in the invention 100. The intermediate structure 102 attaches the counter 161 plate 101 to the bar gun 105 mount 103. The intermediate structure 102 comprises a brink plate 111, a ring plate 112, and a bushing 113. The brink plate 111 attaches to the ring plate 112. The bushing 113 is formed in the ring plate 112.

The brink plate 111 is a prism-shaped structure. The brink plate 111 has a trapezoidal prism shape. The brink plate 111 attaches an edge of the ring plate 112 to an edge of the counter 161 plate 101 such that a cant 114 is formed between the inferior face of the counter 161 plate 101 and the inferior face of the brink plate 111. The arc of the cant 114 is selected to facilitate the attachment and removal of the bar gun 105 to and from the invention 100 respectively.

The ring plate 112 is a plate. The ring plate 112 has a disk structure. The ring plate 112 has a ring structure. The bushing 113 is a negative space that forms the aperture of the ring structure of the ring plate 112. The bushing 113 is a disk-shaped structure formed through the faces of the disk structure of the ring plate 112. The span of the length of the inner diameter of the bushing 113 is greater than the span of the length of the outer diameter of the nozzle 131 of the bar gun 105 such that the nozzle 131 of the bar gun 105 inserts into the bushing 113 of the ring plate 112 of the intermediate structure 102 for storage. The center of the bushing 113 aligns with the center of the ring plate 112.

The ring plate 112 comprises a ring disk 141 and a nozzle 131 grommet 142. The ring disk 141 is a plate. The ring disk 141 has a disk structure. The bushing 113 is physically formed through the faces of the disk structure of the ring disk 141. The nozzle 131 grommet 142 is a grommet. The nozzle 131 grommet 142 is a semi-rigid structure with an elastic nature. The nozzle 131 grommet 142 is geometrically similar to the bushing 113 such that the nozzle 131 grommet 142 inserts into the bushing 113. The nozzle 131 grommet 142 forms a protective sleeve between the nozzle 131 and the bushing 113. The elastomeric nature of the nozzle 131 grommet 142 protects the nozzle 131 from impact damage caused by the edges of the bushing 113.

The bar gun 105 mount 103 is a plate. The bar gun 105 mount 103 has a disk structure. The bar gun 105 mount 103 attaches to the edge of the intermediate structure 102 at a position diametrically opposed to the counter 161 plate 101. The bar gun 105 mount 103 is a magnetic structure. The bar gun 105 mount 103 magnetically attaches the handle 132 of the bar gun 105 to the invention 100 when the nozzle 131 of the bar gun 105 inserts into the intermediate structure 102. The bar gun 105 mount 103 comprises a supporting disk 121 and a first magnet 151.

The supporting disk 121 is a plate. The supporting disk 121 has a disk structure. The supporting disk 121 attaches to the edge of the ring disk 141 that is diametrically opposed to the counter 161 plate 101. The first magnet 151 attaches to the supporting disk 121 using a subset of hardware 104 selected from the hardware 104. The first magnet 151 is a magnetic plate. The first magnet 151 has a disk structure.

The first magnet 151 is geometrically similar to the supporting disk 121. The span of the length of the perimeter of the first magnet 151 is lesser than the span of the length of the perimeter of the supporting disk 121 such that the first magnet 151 fits within the surface area of the superior face of the supporting disk 121. The first magnet 151 magnetically attracts and attaches to the plate member 152 of the bar gun 105 when the nozzle 131 of the bar gun 105 inserts into the bushing 113 of the intermediate structure 102.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Arc: As used in this disclosure, an arc refers to a portion of a circumference or a curved perimeter. When applied to an angle, the arc also refers to a measure of an angular span as measured from a circle at the vertex formed by the sides of the angle.

Brink: As used in this disclosure, a brink refers to the edge or line formed by the intersection of a first plane or surface and a second plane or surface wherein a cant exists between the first plane or surface and the second plane or surface.

Bushing: As used in this disclosure, a bushing is a cylindrical aperture through which an object is guided and potentially secured. Bushings are often used as protective linings.

Cant: As used in this disclosure, a cant is an angular deviation from one or more reference lines (or planes) such as a vertical line (or plane) or a horizontal line (or plane).

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Counter: As used in this disclosure, a counter is a horizontal surface a working space for a project. A counter is further defined with an inferior surface and a superior surface.

Diameter: As used in this disclosure, a diameter of an object is a straight line segment (or a radial line) that passes through the center (or center axis) of an object. The line segment of the diameter is terminated at the perimeter or boundary of the object through which the line segment of the diameter runs. A radius refers to the line segment that overlays a diameter with one termination at the center of the object. A span of a radius is always one half the span of the diameter.

Diametrically Opposed: As used in this disclosure, diametrically opposed is a term that describes the locations of a first object and a second object located at opposite ends of a diameter drawn through a third object. The term diametric opposition can also be used to describe this relationship.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Elastic: As used in this disclosure, an elastic is a material or object that deforms when a force is applied to it and that is able to return to its relaxed shape after the force is removed. A material that exhibits these qualities is also referred to as an elastomeric material. A material that does not exhibit these qualities is referred to as inelastic or an inelastic material.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Grip: As used in this disclosure, a grip is an accommodation formed on or within an object that allows the object to be grasped or manipulated by a hand.

Grommet: As used in this disclosure, a grommet is an eyelet placed in a hole in a textile, sheet, or panel that protects a rope hook or cable passed through it and to protect the textile, sheet, or panel from being torn. See bushing and flange.

Handle: As used in this disclosure, a handle is an object by which a tool, object, or door is held or manipulated with the hand.

Hardware: As used in this disclosure, refers to one or more incidental objects: 1) that are readily and commercially available; and, 2) that are associated with the installation, operation or maintenance of a primary object.

Holster: As used in this disclosure, a holster is a storage structure that attaches to an object. The holster is dedicated to containing a previously identified object such that the previously identified object is readily accessible.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Incidental: As used in this disclosure, incidental refers to a second object that is associated with a first object but that: 1) does not significantly affect the characteristics of the first object; and, 2) the function of which can be readily replaced by or substituted with a third object.

Inferior: As used in this disclosure, the term inferior refers to a directional reference that is parallel to and in the same direction as the force of gravity when an object is positioned or used normally.

Inner Dimension: As used in this disclosure, the term inner dimension describes the span from a first inside or interior surface of a container to a second inside or interior surface of a container. The term is used in much the same way that a plumber would refer to the inner diameter of a pipe.

Loop: As used in this disclosure, a loop is the length of a first linear structure including, but not limited to, shafts, lines, cords, or webbings, that is: 1) folded over and joined at the ends forming an enclosed space; or, 2) curved to form a closed or nearly closed space within the first linear structure. In both cases, the space formed within the first linear structure is such that a second linear structure such as a line, cord or a hook can be inserted through the space formed within the first linear structure. Within this disclosure, the first linear structure is said to be looped around the second linear structure.

Magnet: As used in this disclosure, a magnet is an ore, alloy, or other material that has its component atoms arranged so the material exhibits properties of magnetism such as: 1) attracting other iron-containing objects; 2) attracting other magnets; or, 3) or aligning itself in an external magnetic field.

Manifold: As used in this disclosure, a manifold is a pipe or chamber having several ports through which liquid or gas is gathered or distributed.

N-gon: As used in this disclosure, an N-gon is a regular polygon with N sides wherein N is a positive integer number greater than 2.

Negative Space: As used in this disclosure, negative space is a method of defining an object through the use of open or empty space as the definition of the object itself, or, through the use of open or empty space to describe the boundaries of an object.

Non-Euclidean Disk: As used in this disclosure, a non-Euclidean structure is a disk-shaped structure wherein the congruent end (faces) of the disk structure lies on a non-Euclidean plane.

Non-Euclidean Prism: As used in this disclosure, a non-Euclidean prism is a prism structure wherein the center axis of the prism lies on a non-Euclidean plane.

Nozzle: As used in this disclosure, a nozzle is a device that receives fluid under pressure and releases the fluid in a controlled manner into an environment.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Outer Dimension: As used in this disclosure, the term outer dimension describes the span from a first exterior or outer surface of a tube or container to a second exterior or outer surface of a tube or container. The term is used in much the same way that a plumber would refer to the outer diameter of a pipe.

Perimeter: As used in this disclosure, a perimeter is one or more curved or straight lines that bounds an enclosed area on a plane or surface. The perimeter of a circle is commonly referred to as a circumference.

Plate: As used in this disclosure, a plate is a smooth, flat and semi-rigid or rigid structure that has at least one dimension that: a) is of uniform thickness; and b) that appears thin relative to the other dimensions of the object. Plates often have a rectangular appearance. Plates often have a disk-like structure. The face of the plate is a surface of the plate selected from the group consisting of: a) the surface of the plate with the greatest surface area; b) the surface of the plate that is distal from the surface of the plate with the greatest surface area. The edges of the plate comprise the surfaces of the plate that would not be considered faces as defined above. As defined in this disclosure, plates may be made of any material, but are commonly made of metal, plastic, and wood. When made of wood, a plate is often referred to as a board or a plank.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Pyramid: As used in this disclosure, a pyramid is a three-dimensional shape that comprises a base formed in the shape of an N-gon (wherein N is an integer) with N triangular faces that rise from the base to converge at a point above the base. If the point where the N faces meet is positioned such that a line drawn from the point where the N faces meet to the center of the N-gon base is perpendicular to the N-gon base, the pyramid is referred to as a right pyramid. Pyramids can be further formed with circular or elliptical bases which are commonly referred to as cone or an elliptical pyramid respectively. A pyramid is defined with a base, an apex, and a lateral face. The base is the N-gon shaped base described above. The apex is the convergence point described above. The lateral face is formed from the N triangular faces described above.

Radial: As used in this disclosure, the term radial refers to a direction that: 1) is perpendicular to an identified central axis; or, 2) projects away from a center point.

Relaxed Shape: As used in this disclosure, a structure is considered to be in its relaxed state when no shear, strain, or torsional forces are being applied to the structure.

Ring: As used in this disclosure, a ring is term that is used to describe a disk-like structure through which an aperture is formed. Rings are often considered loops.

Semi-Rigid Structure: As used in this disclosure, a semi-rigid structure is a solid structure that is stiff but not wholly inflexible and that will deform under force before breaking. A semi-rigid structure may or may not behave with an elastic nature in that a semi-rigid structure need not return to its relaxed shape.

Sleeve: As used in this disclosure, a sleeve is a tube-like covering that is placed over a rod, shaft or other cylindrical object.

Superior: As used in this disclosure, the term superior refers to a directional reference that is parallel to and in the opposite direction of the force of gravity when an object is positioned or used normally.

Truncated: As used in this disclosure, a geometric object is truncated when an apex, vertex, or end is cut off by a line or plane.

Truncated Pyramid: As used in this disclosure, a truncated pyramid is a frustum that remains when the apex of a pyramid is truncated by a plane that is parallel to the base of the pyramid.

Valve: As used in this disclosure, a valve is a device that is used to control the flow of a fluid (gas or liquid) through a pipe, tube, or hose.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A bar gun holster comprising:
a counter plate, an intermediate structure, a bar gun mount and hardware;
wherein the counter plate and the bar gun mount attach to the intermediate structure;
wherein the hardware: a) assembles the bar gun holster; and, b) attaches the bar gun holster to a counter;
wherein the bar gun holster is a mechanical device;
wherein the bar gun holster attaches a bar gun to the counter;
wherein the counter is further defined with an inferior surface and a superior surface;
wherein the bar gun dispenses a plurality of beverages;
wherein the counter plate and the bar gun mount attach to the intermediate structure such that the counter plate and the bar gun mount are diametrically opposed;
wherein the bar gun further comprises a nozzle and a handle;
wherein the nozzle has a hollow truncated pyramid structure;
wherein the handle is a prism-shaped structure that forms a grip of the bar gun;
wherein the nozzle attaches to the handle;
wherein the bar gun further comprises a plate member;
wherein the plate member attaches to the handle of the bar gun using a subset of hardware selected from hardware.

2. The bar gun holster according to claim 1
wherein the plate member has a disk structure;
wherein a span of a length of a perimeter of the plate member is lesser than a span of a length of a perimeter of the handle of the bar gun such that the plate member fits within a surface area of a face of a supporting disk.

3. The bar gun holster according to claim 2
wherein the counter plate is a plate;
wherein the counter plate has a disk structure;
wherein the counter plate attaches the intermediate structure to the inferior surface of the counter;
wherein a subset of hardware selected from the hardware attaches the counter plate to the inferior surface of the counter.

4. The bar gun holster according to claim 3 wherein the counter plate attaches the bar gun holster to the counter such that the intermediate structure and the bar gun mount project beyond an edge of the counter such that the intermediate structure and the bar gun mount are not contained within the space underneath the counter.

5. The bar gun holster according to claim 4
wherein the intermediate structure is a plate;
wherein the intermediate structure has a non-Euclidean disk structure;
wherein the intermediate structure has a ring structure.

6. The bar gun holster according to claim 5
wherein an edge of the intermediate structure attaches to an edge of the counter plate;
wherein an aperture of the ring structure of the intermediate structure receives the nozzle of the bar gun.

7. The bar gun holster according to claim 6
wherein the intermediate structure comprises a brink plate, a ring plate, and a bushing;
wherein the brink plate attaches to the ring plate;
wherein the bushing is formed in the ring plate.

8. The bar gun holster according to claim 7
wherein the brink plate is a prism-shaped structure;
wherein the brink plate has a trapezoidal prism shape;
wherein the brink plate attaches an edge of the ring plate to an edge of the counter plate such that a cant is formed between an inferior face of the counter plate and an inferior face of the brink plate.

9. The bar gun holster according to claim 8
wherein the ring plate is a plate;
wherein the ring plate has a disk structure;
wherein the ring plate has a ring structure.

10. The bar gun holster according to claim 9
wherein the bushing is a negative space that forms the aperture of the ring structure of the ring plate;
wherein the bushing is a disk-shaped structure formed through the faces of the disk structure of the ring plate;
wherein the center of the bushing aligns with the center of the ring plate.

11. The bar gun holster according to claim 10 wherein a span of a length of an inner diameter of the bushing is greater than a span of a length of an outer diameter of the nozzle of the bar gun such that the nozzle of the bar gun inserts into the bushing of the ring plate of the intermediate structure.

12. The bar gun holster according to claim 11
wherein the ring plate comprises a ring disk and a nozzle grommet;
wherein the ring disk is a plate;
wherein the ring disk has a disk structure;
wherein the bushing is physically formed through faces of the disk structure of the ring disk;
wherein the nozzle grommet is a grommet;
wherein the nozzle grommet is a semi-rigid structure with an elastic nature;
wherein the nozzle grommet inserts into the bushing.

13. The bar gun holster according to claim 12
wherein the bar gun mount is a plate;
wherein the bar gun mount has a disk structure;
wherein the bar gun mount attaches to the edge of the intermediate structure at a position diametrically opposed to the counter plate.

14. The bar gun holster according to claim 13
wherein the bar gun mount is a magnetic structure;
wherein the bar gun mount magnetically attaches the handle of the bar gun to the bar gun holster when the nozzle of the bar gun inserts into the intermediate structure.

15. The bar gun holster according to claim 14
wherein the bar gun mount comprises a supporting disk and a first magnet;
wherein the first magnet attaches to the supporting disk using a subset of hardware selected from the hardware.

16. The bar gun holster according to claim 15
wherein the supporting disk is a plate;
wherein the supporting disk has a disk structure;
wherein the supporting disk attaches to an edge of the ring disk that is diametrically opposed to the counter plate;
wherein the first magnet is a magnetic plate.

17. The bar gun holster according to claim 16
wherein the first magnet has a disk structure;

wherein a span of a length of a perimeter of the first magnet is lesser than a span of a length of a perimeter of the supporting disk such that the first magnet fits within a surface area of a superior face of the supporting disk;

wherein the first magnet magnetically attracts and attaches to the plate member of the bar gun when the nozzle of the bar gun inserts into the bushing of the intermediate structure.

* * * * *